(12) United States Patent
Romdhani

(10) Patent No.: US 11,132,531 B2
(45) Date of Patent: Sep. 28, 2021

(54) METHOD FOR DETERMINING POSE AND FOR IDENTIFYING A THREE-DIMENSIONAL VIEW OF A FACE

(71) Applicant: Idemia Identity & Security France, Courbevoie (FR)

(72) Inventor: Sami Romdhani, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 118 days.

(21) Appl. No.: 16/548,957

(22) Filed: Aug. 23, 2019

(65) Prior Publication Data
US 2020/0065564 A1 Feb. 27, 2020

(30) Foreign Application Priority Data
Aug. 23, 2018 (FR) .................................... 1857623

(51) Int. Cl.
G06K 9/00 (2006.01)
G06N 3/04 (2006.01)

(52) U.S. Cl.
CPC ..... *G06K 9/00288* (2013.01); *G06K 9/00214* (2013.01); *G06K 9/00228* (2013.01); *G06K 9/00281* (2013.01); *G06N 3/04* (2013.01)

(58) Field of Classification Search
CPC ........... G06K 9/00288; G06K 9/00228; G06K 9/00214; G06K 9/00281; G06K 9/00241; G06N 3/04
See application file for complete search history.

(56) References Cited

U.S. PATENT DOCUMENTS

| 7,436,988 B2* | 10/2008 | Zhang ............... G06K 9/00268 382/118 |
| 2006/0120571 A1* | 6/2006 | Tu ...................... G06K 9/00288 382/118 |

(Continued)

OTHER PUBLICATIONS

Li Deqiang and Pedrycz Witold: "A central profile-based 3D face pose estimation": Pattern Recognition: Aug. 8, 2013: pp. 525-534: vol. 47, No. 2, : Elsevier, GB.

(Continued)

*Primary Examiner* — Ming Y Hon
(74) *Attorney, Agent, or Firm* — Womble Bond Dickinson (US) LLP

(57) ABSTRACT

The invention relates to a method of face detection and determination of face pose from a three-dimensional mesh comprising the steps of:
determining (200) a curvature map of the three-dimensional surface, according to an average curvature or a Gaussian curvature,
detecting (300), within the curvature map, a facial nose tip (B) where the three-dimensional facial surface has a predetermined curvature,
determining (400) a face pose defined by coordinates of the nose tip (B) and by three angles of rotation of the face around three axes,
delineating a face zone and comparison (450) between the delineated face zone and a reference face template, in order to validate the detection of a real face in the three-dimensional mesh.
The invention also relates to a method for checking the identity of an individual, using a frontalized shot of their face obtained via the method for face detection and determination of pose applied to a not necessarily frontalized shot.

16 Claims, 12 Drawing Sheets

(56) References Cited

U.S. PATENT DOCUMENTS

| | | | | |
|---|---|---|---|---|
| 2009/0202114 | A1* | 8/2009 | Morin | A63F 13/213 |
| | | | | 382/118 |
| 2013/0307848 | A1* | 11/2013 | Tena | G06T 17/205 |
| | | | | 345/420 |
| 2014/0160123 | A1* | 6/2014 | Yang | G06T 17/00 |
| | | | | 345/420 |
| 2018/0018558 | A1* | 1/2018 | Lee | G06N 3/0445 |
| 2020/0250403 | A1* | 8/2020 | Xiao | G06K 9/00268 |

OTHER PUBLICATIONS

Sotiris Malassiotis and Michael G. Strintzis: "Robust real-time 3D head pose estimation from range data": Pattern Recognition: Aug. 1, 2005: pp. 1153-1165: vol. 38, No. 8,: Elsevier, GB.

Parama Bagchi, Debotosh Bhattacharjee and Mita Nasipuri: "A robust analysis, detection and recognition of facial features in 2.5D images": Multimedia Tools and Applications: Oct. 9, 2015: pp. 11059-11096: vol. 75, No. 18: Kluwer Academic Publishers, Boston, US.

Search Report of the National Institute of Industrial Property of France for FR1857623 dated Jun. 17, 2019.

* cited by examiner

METHOD FOR DETERMINING POSE AND FOR IDENTIFYING A THREE-DIMENSIONAL VIEW OF A FACE

CROSS-REFERENCE TO RELATED APPLICATIONS

This application claims the benefit of French Patent Application No. 1857623 filed on Aug. 23, 2018, the disclosure of which is herein incorporated by reference in its entirety.

TECHNICAL FIELD OF THE INVENTION

The invention falls within the field of processing three-dimensional images, and in particular processing images comprising one or more individual faces.

The invention has a first application for face detection and determining the pose of the face of an individual in an acquired image, and a second application for identifying an individual using a frontalized image of the face.

STATE OF THE ART

Determining the face pose is useful for numerous applications. Face pose refers to the position of a face relative to a frontal view, in an image acquired by a sensor.

For instance, a driver assistance system may issue an alert whenever a vehicle driver is not in a front-facing position suitable for keeping his/her eyes on the road.

It may also be necessary to determine face pose in a shot of an individual during an algorithm for identifying that person, during the course of which the resemblance between a reference shot of the individual and an acquired shot is evaluated. This is because facial recognition works optimally when the acquired shot and the reference shot are centered and front-facing, because the shape of the face is most visible when it is in a centered, front-facing position.

However, it is often not possible to obtain a front-facing, centered shot of the face during identification, particularly when the individual is not voluntarily participating in his/her own identification, such as in the context of surveillance images. Thus, there are algorithms to "frontalize" an acquired shot of a face, in order to obtain a centered, front-facing shot.

This frontalization requires processing the acquired shot to determine the face pose. Knowledge of the pose, shape, and texture of the face makes it possible to generate a frontalized shot.

It is known how to determine the three-dimensional face pose of a two-dimensional face image, the pose having the shape of a rotation matrix and a translation vector. One known algorithm consists of comparing the positions of facial characteristic points on the two-dimensional image to characteristics of a face template, and of identifying a rotation and a translation of the face template that minimize the distance between characteristic points.

However, this solution requires trying a potentially large number of rotations and translations in order to achieve a good pose estimate, which requires a lot of resources and computing time. Estimating a three-dimensional pose from a two-dimensional shot is also imprecise. The algorithm cannot autonomously verify whether the pose estimate is accurate.

Additionally, this solution can only be used from a two-dimensional face image with good visibility.

Known from the prior art, for example from document U.S. Pat. No. 7,436,988 B2, is searching for the tip of the nose within a three-dimensional image in which a zone corresponding to a face has already been detected. Face detection algorithms are applied to a three-dimensional mesh, then a principal components analysis is performed to produce symmetrization of a detected facial area. A tip of the nose is detected from the symmetrized face to complete the determination of the pose of the face.

However, this method from the prior art is not satisfactory when the three-dimensional mesh acquired includes detection "noise," i.e. visible elements other than a face in the photographed scene. It can then be necessary to perform a pre-processing of the three-dimensional mesh in order to isolate a face.

GENERAL DESCRIPTION OF THE INVENTION

There is, therefore, a need for a method of face detection and of determining the face pose that is more efficient while having a reasonable computing cost.

Face detection and pose determination must remain effective even from a three-dimensional image taken for input that includes parasitic elements in addition to the face, or a poorly framed face.

Thus, a method is sought for face detection and pose determination that is robust and that does not require pre-processing to isolate a face in a three-dimensional image taken for input.

There is also a need for a method for generating a frontalized shot that is effective even from a shot of the face that does not benefit from optimal visibility conditions.

It is also sought to have a method for identifying an individual from a three-dimensional shot that produces reliable results at a reasonable computing cost.

To that end, according to a first aspect the invention concerns a method of face detection and of face pose determination from a three-dimensional mesh comprising a plurality of three-dimensional peaks and further comprising surface elements between said peaks forming a three-dimensional surface, the method comprising the following steps executed by a processing unit:

determining a curvature map of the three-dimensional surface, with points on the curvature map corresponding to points on the three-dimensional surface, detecting, within the curvature map, a nose tip where the three-dimensional surface has a predetermined curvature, from the three-dimensional mesh centered on the nose tip, determining a face pose, the pose being defined by coordinates of the nose tip, by a first angle of rotation of the face around a first axis, by a second angle of rotation of the face around a second axis, and by a third angle of rotation of the face around a third axis, delineation of a face zone composed of three-dimensional peaks of the mesh selected based on the position thereof relative to the nose tip, and comparison between the delineated face zone and a reference face template, a result of the comparison making it possible to validate a detection of a real face in the three-dimensional mesh and of validating the pertinence of the tip of the nose.

Thus, in the method of the invention, the tip of the nose is sought by using a curvature map of the three-dimensional surface of the mesh, and it is then used as basis for determining the pose. The three constituent angles of rotation of the pose are easily detectable by using the nose tip as characteristic point.

Moreover, the method of the invention comprises the delineation of a face zone from the position of the nose tip, then a comparison with a reference template. Face detection on the basis of the nose tip is simple and quick; optionally, if the face detection is not validated, it is easy to reiterate the face detection from another nose tip candidate. The method of the invention therefore has improved robustness.

Advantageously and optionally, the method has the following characteristics, taken alone or in any of their technically possible combinations:

the detecting of the nose tip is implemented without prior detection of a face zone in the three-dimensional mesh or in the curvature map.

Indeed, the face zone is preferably detected from the detected nose tip and the presence of a face is verified at this stage, without the need to perform a verification of presence of face prior to the detection of the nose tip;

during the step of determining a curvature map, a first curvature map is established for an average curvature and a second curvature map is established for a Gaussian curvature;

the step of detection comprises determining a region of the three-dimensional surface whose average curvature of points is within an average lower bound and an average upper bound, and whose Gaussian curvature of points is within a Gaussian lower bound and a Gaussian upper bound;

a plurality of regions of the three-dimensional surface, not connected two-by-two, are detected during the step of detection forming candidate regions, the center of one of the largest regions among the candidate regions being determined to be the nose tip;

the calculation of at least one angle among the three angles of rotation comprises the detection of a nose tip in the three-dimensional surface, the nose tip preferably being identified as the point of maximum curvature along a profile at the intersection between the plane of partial symmetry and the three-dimensional mesh;

the calculation of at least two angles among the three angles of rotation comprises the determination of a plane of partial symmetry of the three-dimensional surface passing through the nose tip;

the largest region is determined as not containing the nose tip if the plane of partial symmetry obtained by treating the center of said region as the nose tip gives, by symmetry, facial peak images too far from the peaks of the mesh, or if the point of minimum curvature along the profile, considered to be a refined estimate of the nose tip, is too far from the center of the region, or if the curvature of said point of minimum curvature is not within a predetermined interval, or, if the curvature of the bridge of the nose along a facial profile is not within a second predetermined interval, or if a distance between the nose bridge and the nose tip is not within a third predetermined interval, said determination preferably being made before the comparison to the base template of reference, the steps of detecting and calculating three angles of rotation then being repeated when leaving the largest-size region of the candidate regions;

the method comprises additional steps of calculating an optical flow between the points of a two-dimensional projection of the three-dimensional mesh and points of a two-dimensional projection of an image mesh of the three-dimensional mesh according to a plane passing through the previously calculated nose tip, and correction of the face pose based on the calculated optical flow.

the method comprises preliminary steps of acquisition, by a three-dimensional sensor, of a depth map of a scene and calculation of the three-dimensional mesh from said depth map.

The invention also relates to a method for generating a front-facing shot of an individual from a depth map, comprising the steps of the method according to the first aspect defined above during which the detection of a real face is validated, and comprising an additional step of applying to the three-dimensional mesh a rotation along the three previously determined angles of rotation, resulting in a frontalized mesh.

The invention also relates to a method for checking the identity of an individual, comprising the implementation of a method for generating a front-facing shot as defined above, and comprising an additional step of comparison between at least one image of the frontalized mesh and at least one image of a three-dimensional reference mesh previously acquired from the individual in a certified way, the image of the frontalized mesh and the image of the three-dimensional reference mesh being chosen from one of the following four channels: Depth map and/or map of the component according to the third axis of the normals to the three-dimensional surface and/or average curvature map and/or Gaussian curvature map, the individual being considered properly identified or not based on the result of the comparison.

The checking method may have the additional following characteristics, taken alone or in any of the technically possible combinations:

the frontalized mesh and the three-dimensional reference mesh are compared via each of the four channels defined above;

the comparison is carried out by a processing unit comprising a first convolutional neural network whose parameters were learned by machine learning;

an acquired two-dimensional image is further compared, during a second comparison, to a two-dimensional reference image previously acquired from the individual in a certified way, the second comparison being carried out by a processing unit comprising a second convolutional neural network that is preferably distinct from the first convolutional neural network.

The invention relates, according to a second aspect, to a system comprising an acquisition unit comprising a three-dimensional sensor configured to acquire a depth map of a face, as well as a processing unit configured to implement a method of face detection and pose determination as defined above in such a way as to determine a pose of the face from the depth map.

Advantageously and optionally, the processing unit is configured to generate a frontalized mesh, the system further comprising a management unit comprising a memory in which a plurality of images of three-dimensional reference meshes are recorded, the management unit being equipped with a convolutional neural network configured to make a comparison between a frontalized mesh image and a three-dimensional reference mesh image according to the checking method as defined above.

Finally, the invention relates, according to a third aspect and according to a fourth aspect, respectively:

to a computer program comprising code instructions enabling the implementation of a method of face detection and determination of pose, generating a front-facing shot, or checking an identity as defined above, when said code instructions are executed by a processing unit, and to computer-readable means of storage in which code instructions are pre-saved enabling the implementation of a method of face detection and determination of pose, generating a front-facing shot, or checking an identity as defined above.

GENERAL DESCRIPTION OF THE FIGURES

Other characteristics, goals, and advantages of the invention will become clear from the following description, which is purely illustrative and non-limiting, accompanied by the attached drawings in which:

FIG. 1 schematically depicts a face detection, pose determination and identity checking system according to the invention;

Figure 4B:
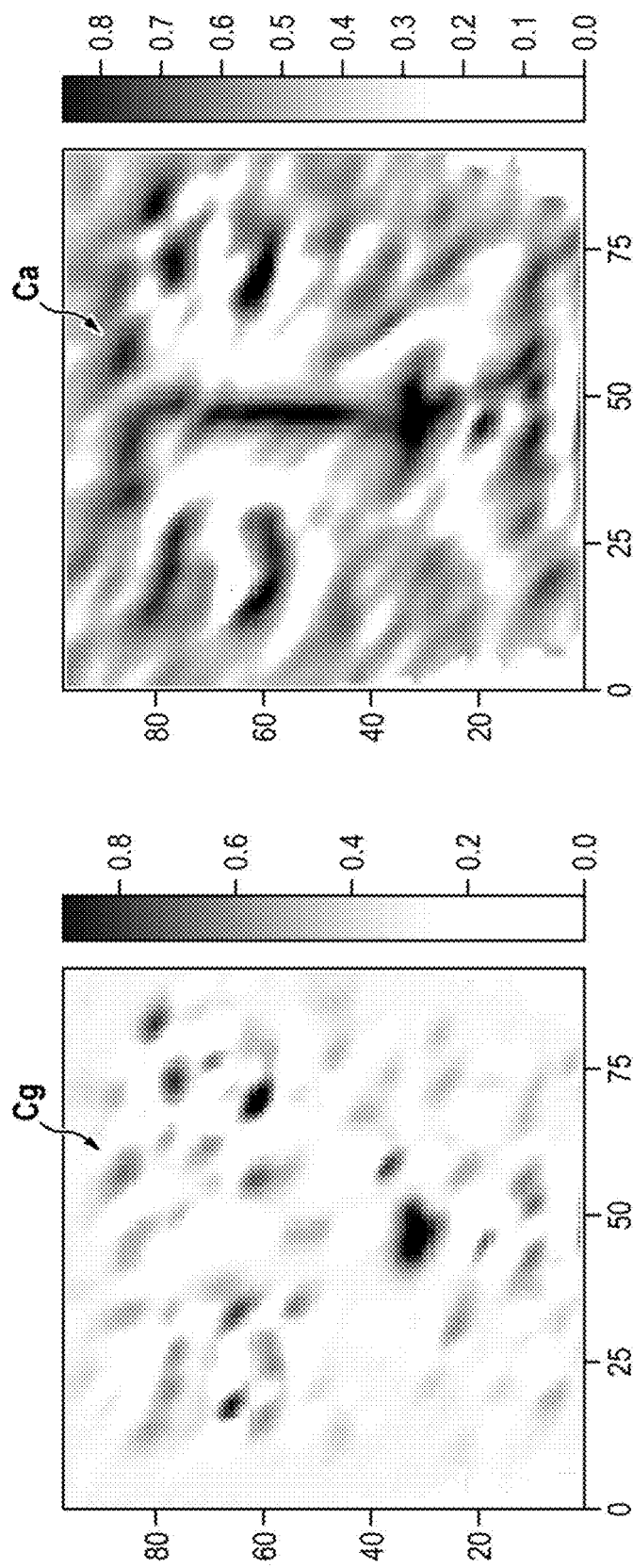
Figure 4A:
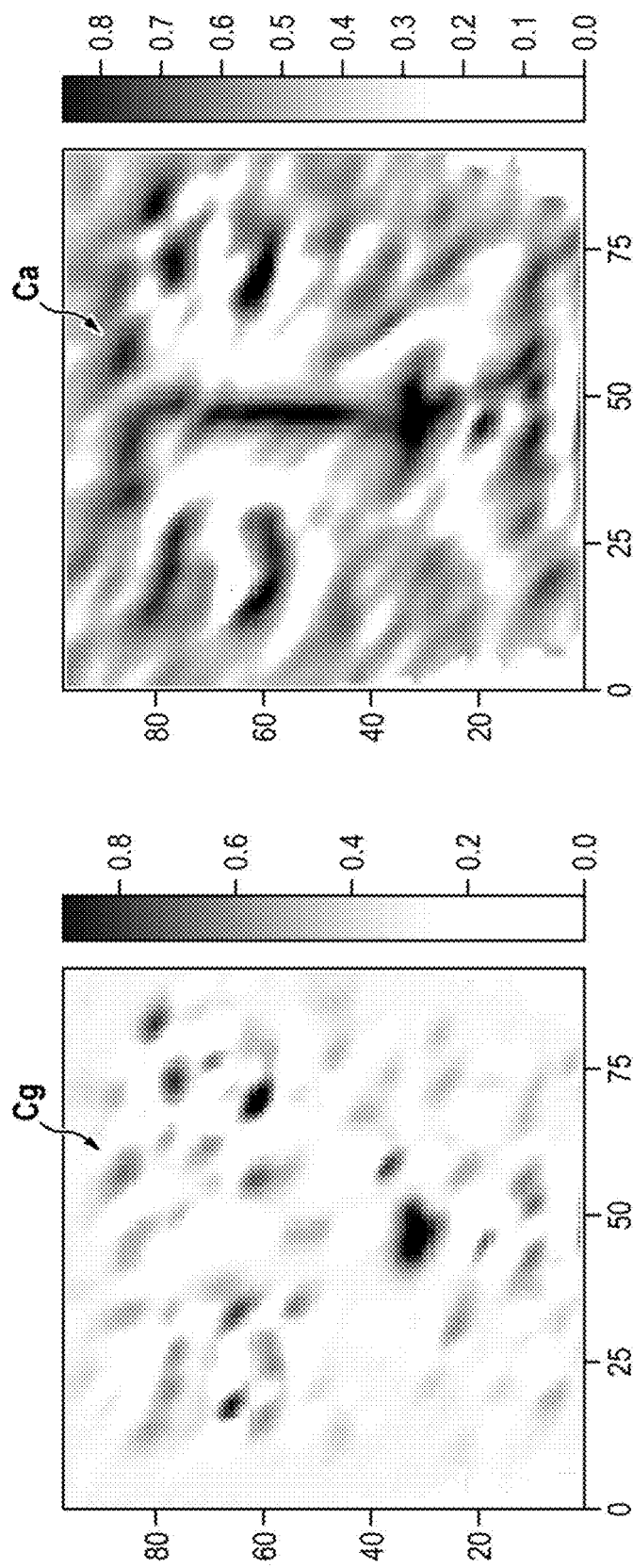
Figure 5:
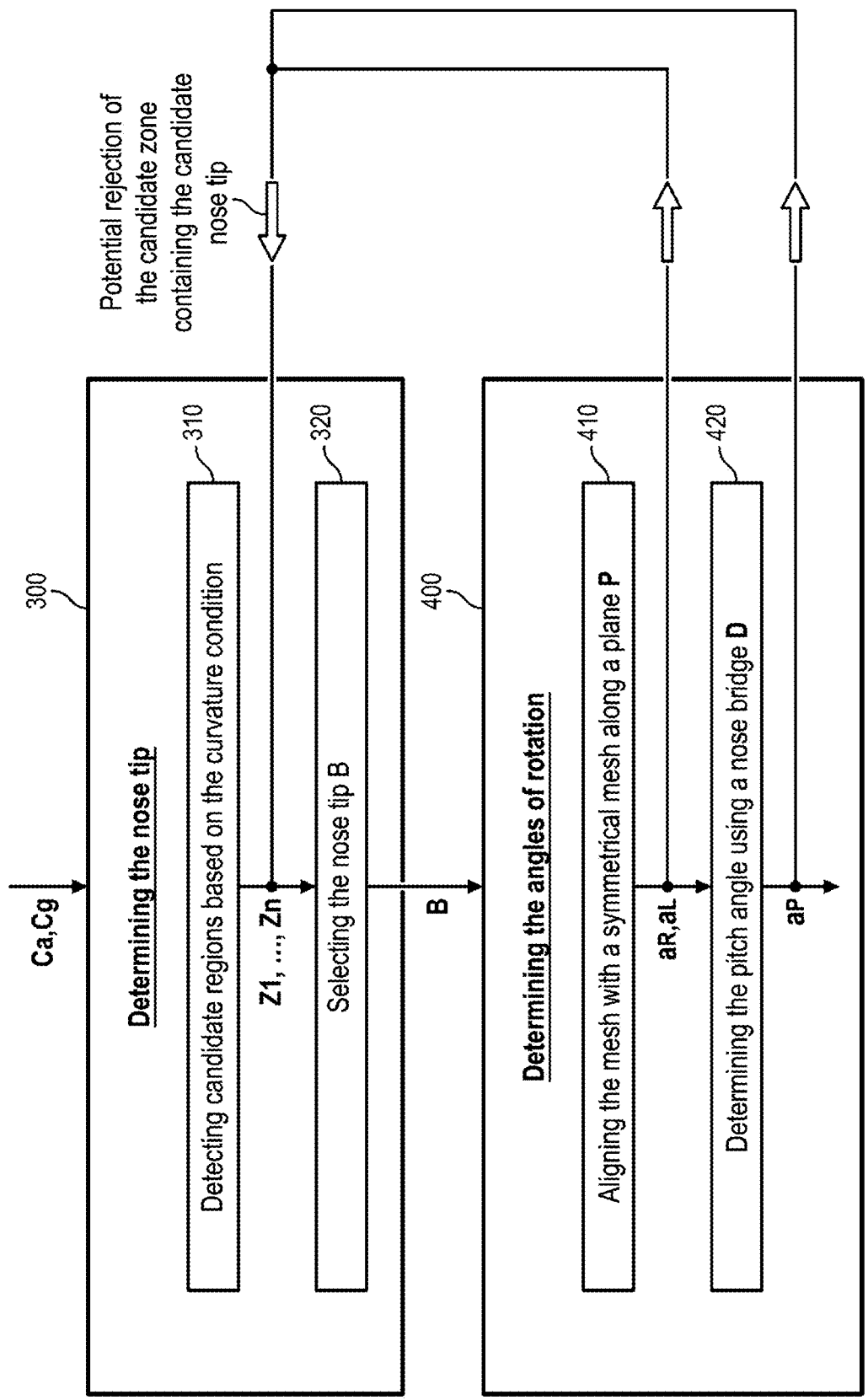
Figure 6C:
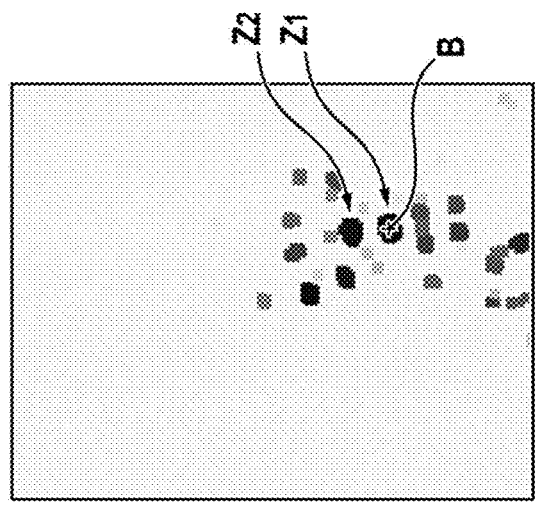
Figure 6B:
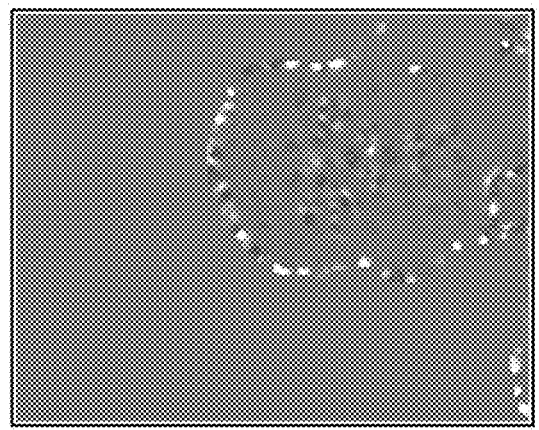
Figure 6A:
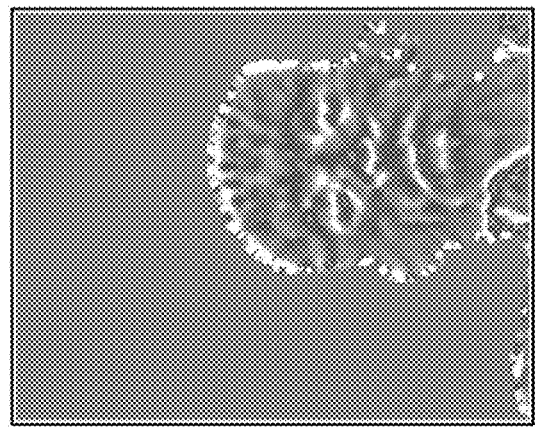
Figure 7A:
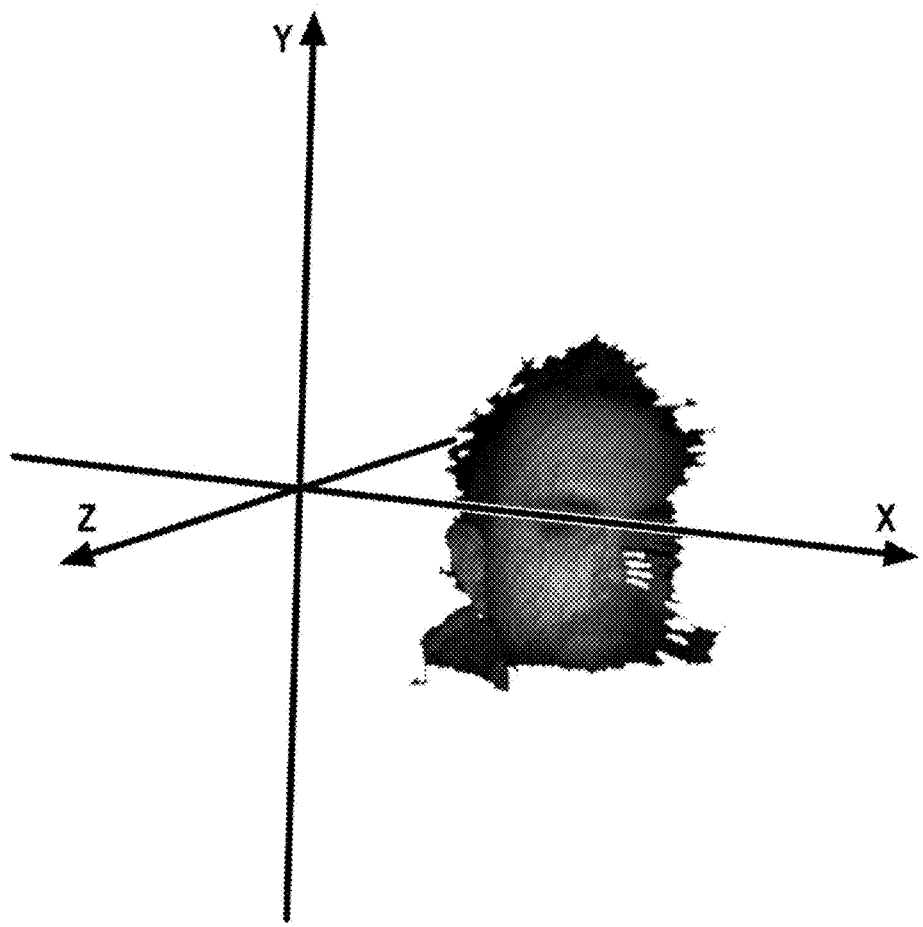
Figure 7C:
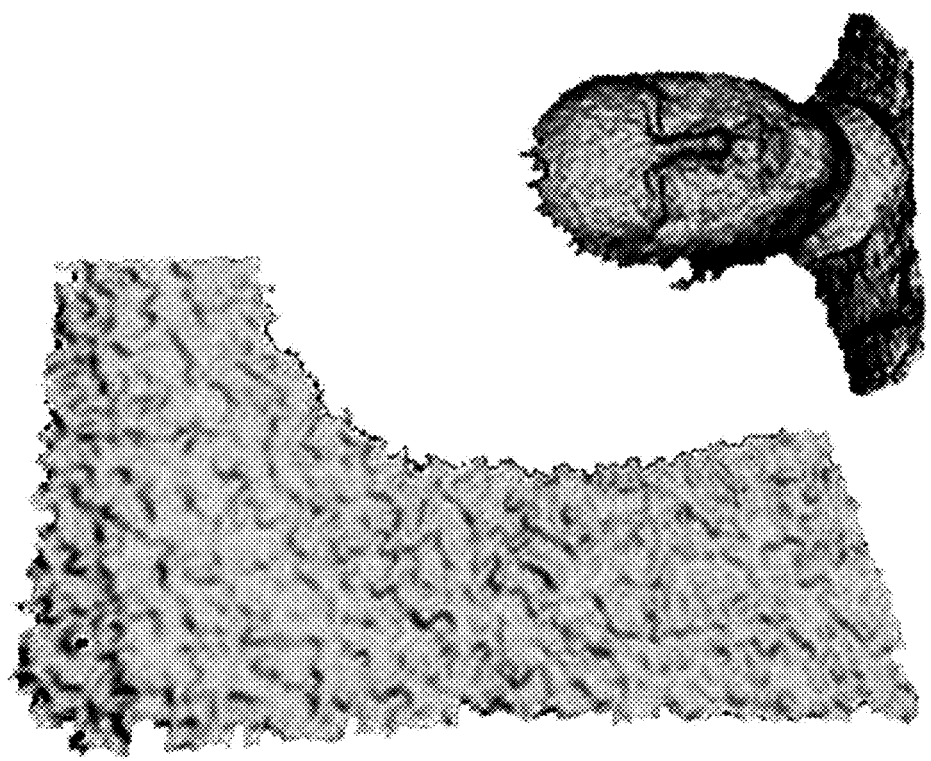
Figure 7B:
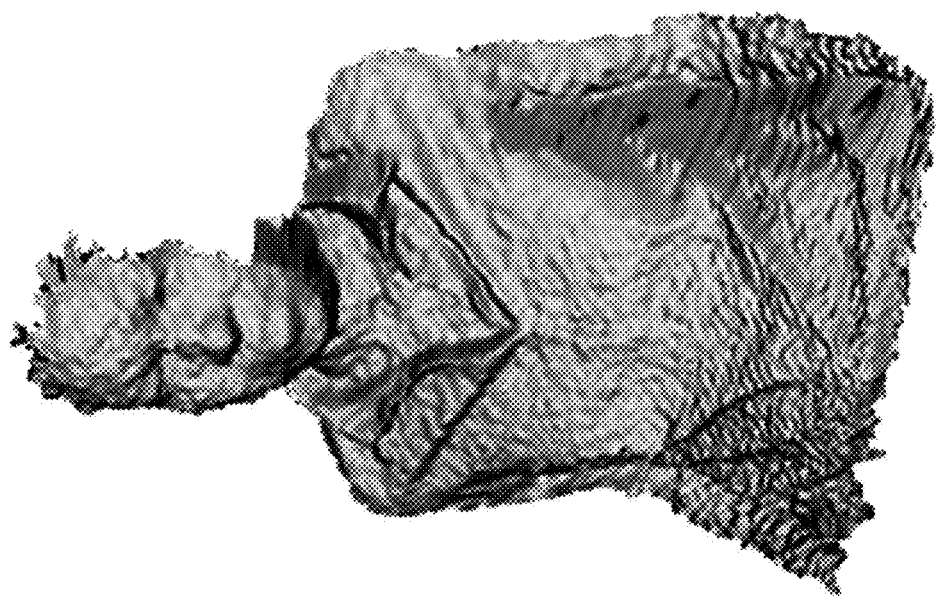
Figure 8:
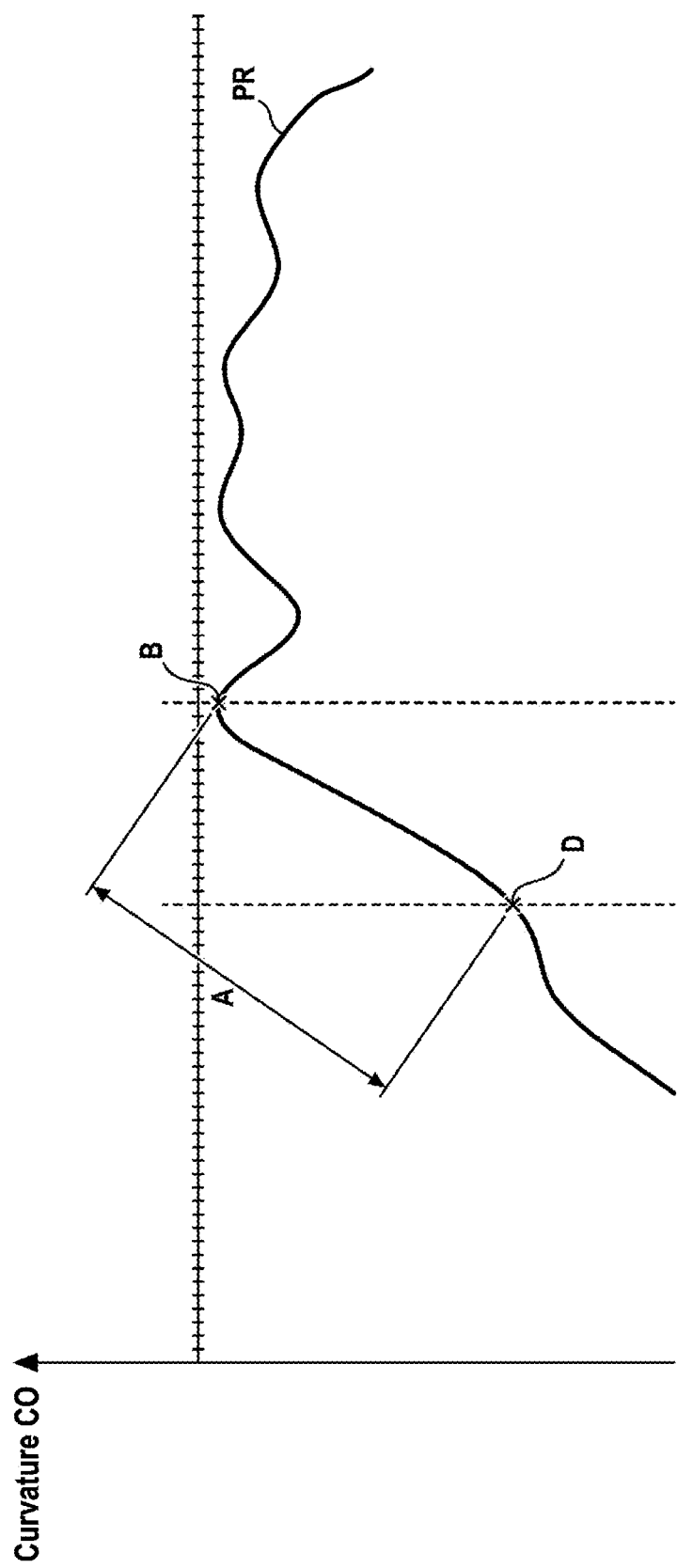
Figure 9:
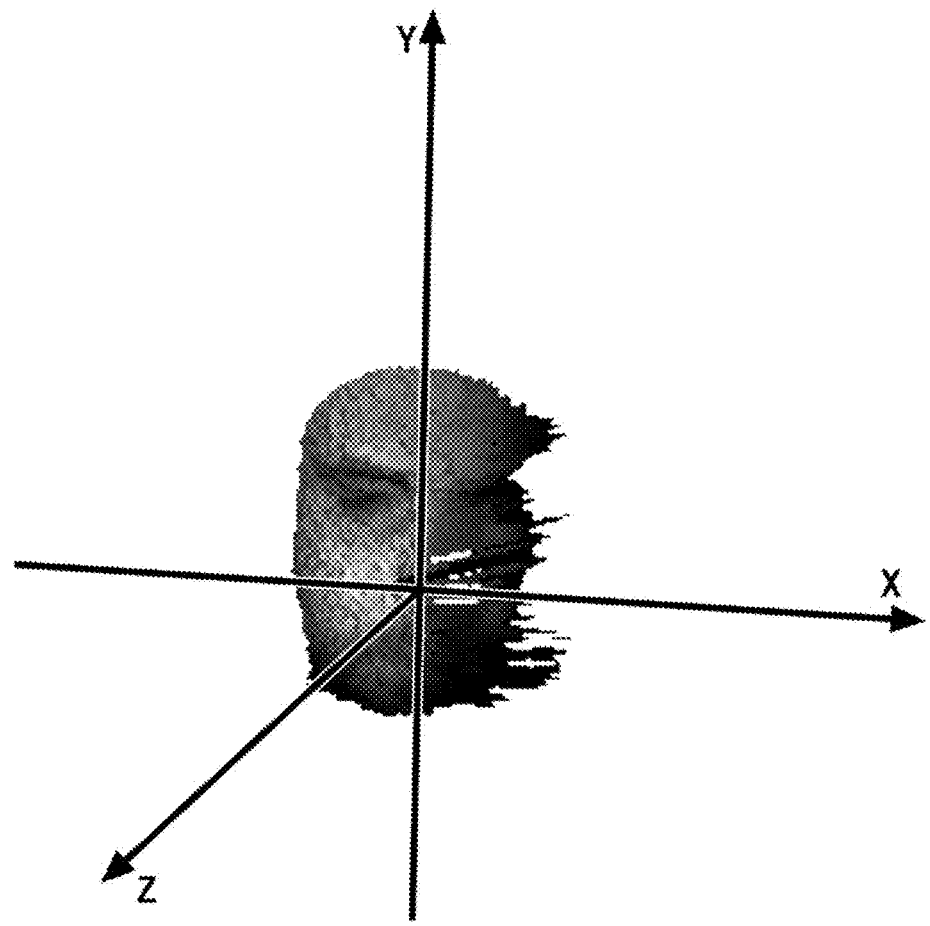
Figure 10:
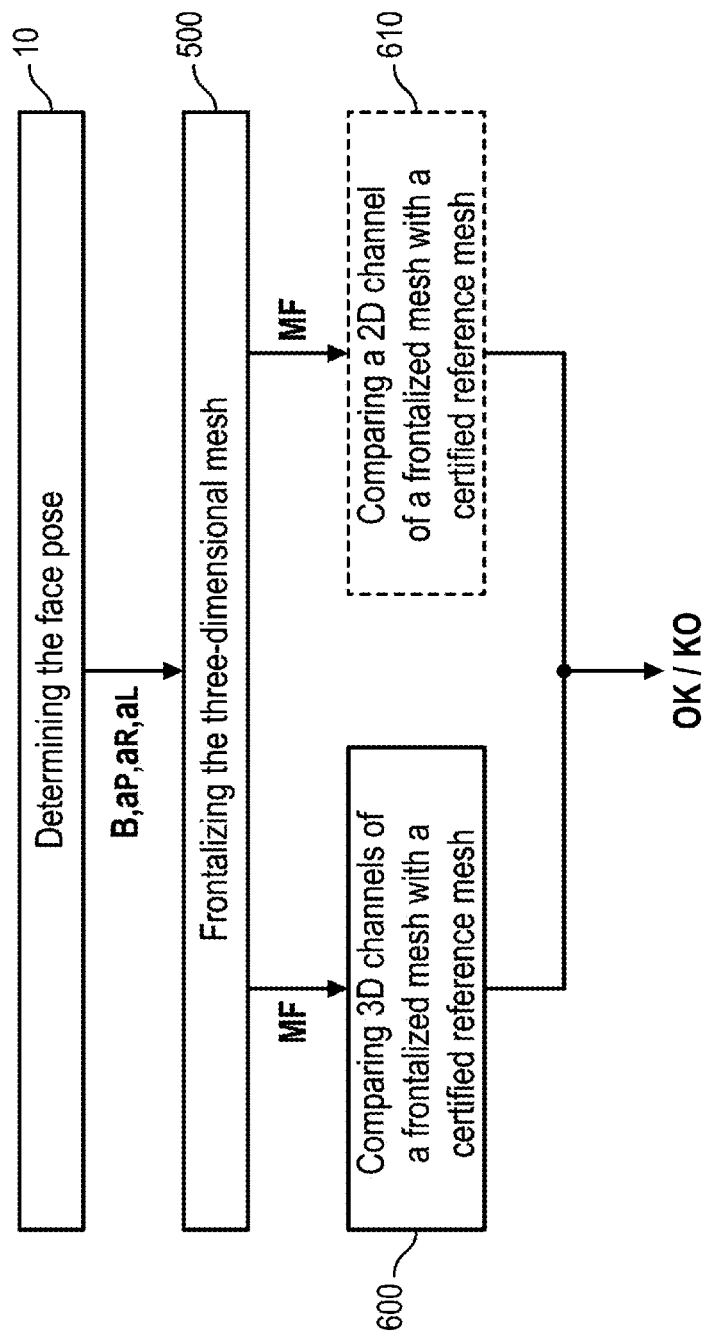
Figure 11:
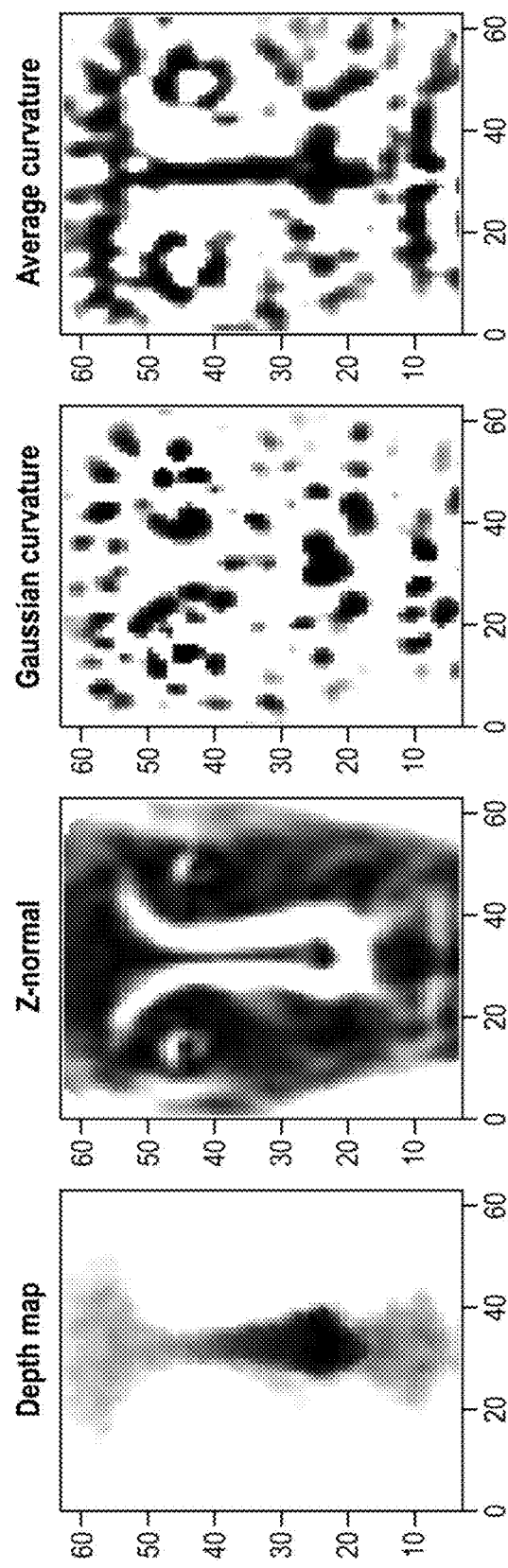

FIGS. 4a and 4b respectively correspond to a Gaussian curvature map and an average curvature map both obtained from the same three-dimensional mesh comprising a face;

FIG. 5 depicts one example of the steps of determining the nose tip and of determining the angles of rotation;

FIGS. 6a, 6b and 6c respectively represent a Gaussian curvature map, an average curvature map, and a representation of candidate regions for containing the nose tip;

FIG. 7a depicts a second three dimensional mesh positioned in an orthogonal three-dimensional reference, said mesh comprising a single real face;

FIG. 7b represents a third three-dimensional mesh comprising a real face as well as a bust of an individual;

FIG. 7c represents a fourth three-dimensional mesh comprising a real face of an individual as well as a background scene;

FIG. 8 depicts a profile of the face in FIG. 7a according to a plane of symmetry P;

FIG. 9 depicts the three-dimensional mesh of FIG. 7a after frontalization;

FIG. 10 depicts the steps of a method for checking the identity of an individual according to one embodiment of the invention;

FIG. 11 gives, from left to right, a depth map, a map of Z-normals, a Gaussian curvature map, and an average curvature map obtained from the same three-dimensional mesh comprising a face.

DETAILED DESCRIPTION OF EMBODIMENTS

Figure 1:
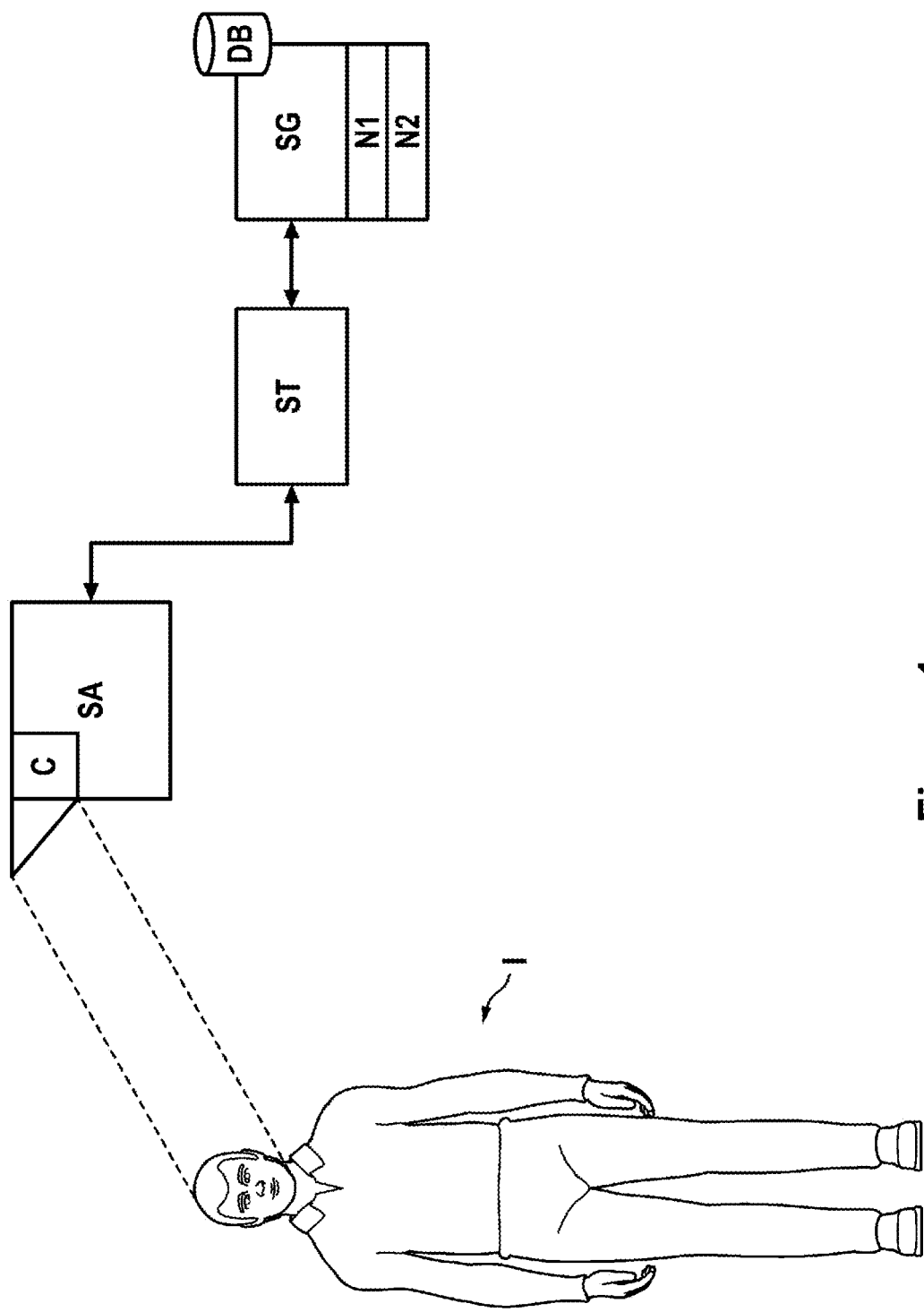

In the remainder of the document, the face's "pose" corresponds to its orientation in an acquired shot, relative to a centered, front-facing orientation. This pose is described by three angles of rotation of the face in space and by the position of a point on the face, such as the nose tip.
Image Acquisition and Processing System Represented in FIG. 1 is a system of acquiring and processing an image assumed to illustrate the face of an individual I. This system is adapted to perform the detection of the face of the individual (i.e. verify that the acquired image is actually a face, and if appropriate to distinguish that face from other elements present in the image), and the determination of the pose of the face in the acquired image. Advantageously, the system is also configured to implement the generation of a front view of the face from this image, and to identify the individual I from the front view.

The system comprises an acquisition unit SA comprising a sensor C. The acquisition unit SA comprises, for instance, a processor and memory for recording the shots provided by the sensor C.

Significantly, the sensor C is a three-dimensional sensor that can acquire a three-dimensional representation of the front of the face of the individual I. Preferably, it is an "active" sensor that does not require cooperation from an individual I while also being instantaneous.

One may use a "metric" sensor, associating each point on the surface of the face with a distance relative to the sensor. As an example, the sensor C may be a "time-of-flight" sensor for accurately calculating the round-trip time of a light ray. It may also be a "structured light" sensor that detects the image of a light grid on the face.

The sensor C provides a depth map of the face of the individual I, in which each pixel has a color that depends on the distance between the corresponding point on the face and the sensor. The depth map is metric, meaning that the value of the pixels corresponds to an absolute distance, not a relative one. Standard passive or monocular sensors are unable to provide metric depth maps.

For multiple applications, it is relevant to know the pose of the individual I. In the example in FIG. 1, it is sought to check the identity of the individual I.

To that end, the system comprises a processing unit ST comprising processing means, for example a processor, suitable for implementing a processing for the purpose of "frontalizing" the face shot acquired by the sensor C. The unit ST comprises a processor or a plurality of processors in which instructions are encoded to automatically execute multiple processes based on a three-dimensional face mesh M produced from the acquired shots. These processes are described hereinafter. The processor(s) is(are) configured particularly to identify a nose tip from a curvature map, to seek a plane of symmetry of the three-dimensional mesh and to make a comparison between a face zone delineated in the mesh and a reference template pre-recorded in a memory of the unit ST. The unit ST further comprises a communication interface with the acquisition unit SA for receiving the acquired shots.

The system further comprises a management unit SG for conducting an identity check. The unit SG comprises a database DB in which a plurality of three-dimensional reference mesh images are recorded (or the SG unit communicates with such a database via a communication network). The unit SG comprises a processor configured to implement a comparison of a frontalized image with an image from the database DB, in order to determine whether the faces match the same person.

Preferably, the management unit SG comprises a processor programmed with a first convolutional neural network N1, and optionally, a second convolutional neural network N2.

In another example, one may determine the face pose to enable the individual I to correct the orientation of their face, particularly in driving assistance systems. For this particular example, the system does not necessarily comprise the management unit SG, and the unit ST is not necessarily suited to generating a frontalized shot.
Method for Determining Pose and for Generating a Frontalized Shot With reference to the attached FIG. 2, first described is a method for determining a face pose, implemented, for instance, by the processing unit ST of the system of FIG. 1.

In one step 100, the sensor C acquires a depth map of the face of an individual I, based on the instruction of the processing unit ST.

In one step 150, a three-dimensional mesh M, representative of the face's surface, is calculated based on the depth map.

The term "three-dimensional mesh" refers to a representation of the shape of the surface of the face, in a three-dimensional frame of reference. Such a mesh comprises a plurality of three-dimensional peaks, identified by their coordinates, and further comprises surface elements that connect said peaks to form a three-dimensional surface.

This step will not be detailed here, but to reiterate the general principle: the intrinsic parameters of the sensor C, particularly the focal distances and optical center, are known, and each pixel in the depth map may therefore be converted into a three-dimensional peak. Surface elements, delineated by multiple peaks, are then configured automatically.

Figure 3:
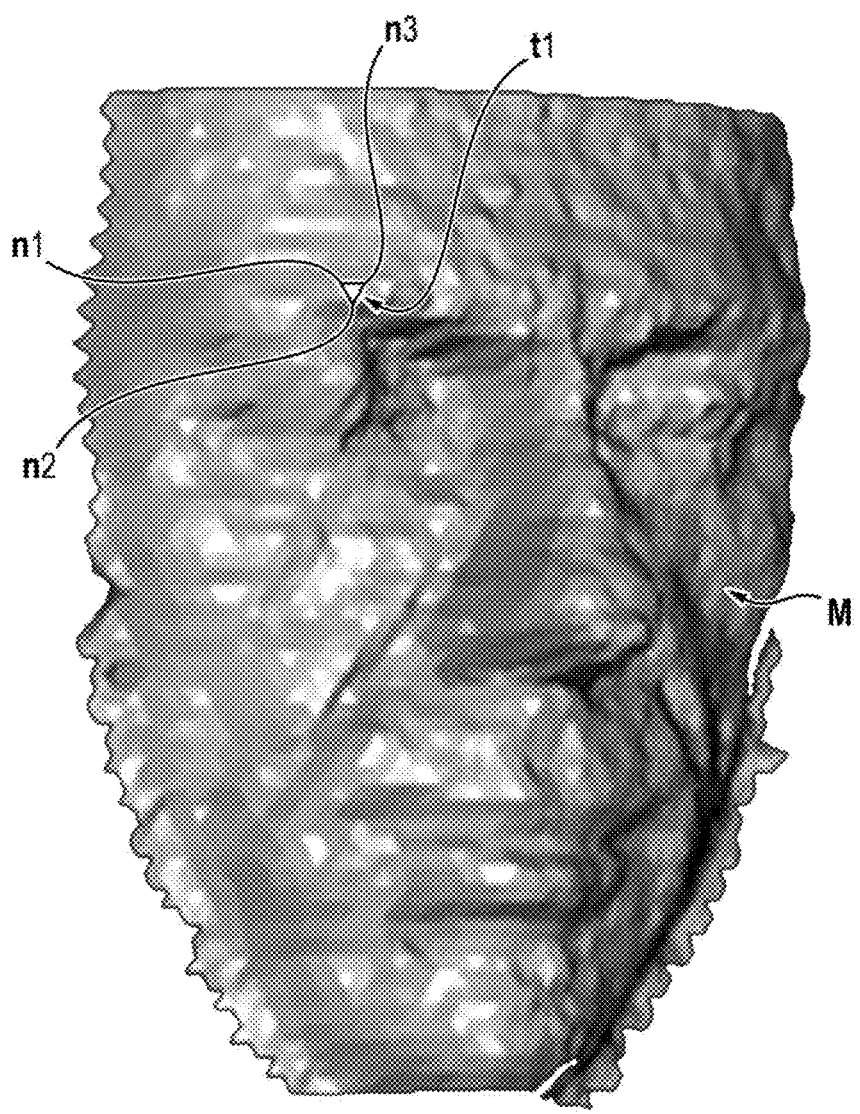
FIG. 3 depicts a first three-dimensional mesh in which a single real face is present.

FIG. 3 depicts a view (not front) of a mesh M produced from the computation of step 150. The display provided by a graphic interface of the processing unit ST can correspond to the representation of this figure. The mesh M comprises numerous peaks (such as several thousand of them) which include the peaks $n_1$, $n_2$ and $n_3$. The mesh M comprises, as surface elements, triangles delineated by peaks which include the triangle ti delineated by $n_1$, $n_2$ and $n_3$.

Steps 100 and 150 are optional. This is because the processing unit ST may receive a depth map, or receive a three-dimensional mesh that has already been calculated.

Returning to FIG. 2, the method for determining pose comprises processing intended to determine a peak of the mesh M corresponding to the nose tip B of the face. The tip of the nose is used as the anchor to detect a face in the three-dimensional mesh and to determine the position thereof. This specific point is advantageous because it has particular curvature properties.

To that end, the step 200 consists of obtaining one or more curvature maps from the three-dimensional surface described by the mesh M. A curvature map corresponds to a specific type of curvature and to a two-dimensional projection of the surface of the face. Each pixel is associated with the curvature calculated on the corresponding point of the surface.

Advantageously, the curvature map obtained corresponds to an average curvature of the three-dimensional mesh or to a Gaussian curvature. Preferably, two maps are calculated in step 200: A map Cg of the Gaussian curvature and a map Ca of the average curvature from the mesh M, according to the same orientation that corresponds to the front of the face. It is advantageous to use these curvatures because they vary specifically in the vicinity of the nose tip.

For example algorithms to estimate these two curvatures for a surface described by a triangular mesh, one may refer to the following document: *A comparison of gaussian and mean curvatures estimation methods on triangular meshes*, Surazhsky, T., Magid, E., Soldea, O., Elber, G., & Rivlin, E. In Robotics and Automation, 2003. Proceedings. ICRA '03. IEEE (Vol. 1, pp. 1021-1026), section 3. For determining maps of average curvature and of Gaussian curvature, it is particularly advantageous to use the Gauss-Bonnet method described in said section of this document.

FIG. 4a depicts a Gaussian curvature map Cg, and FIG. 4b an average curvature map Ca; the region around the nose tip corresponds both to a high Gaussian curvature and a high average curvature.

Figure 2:
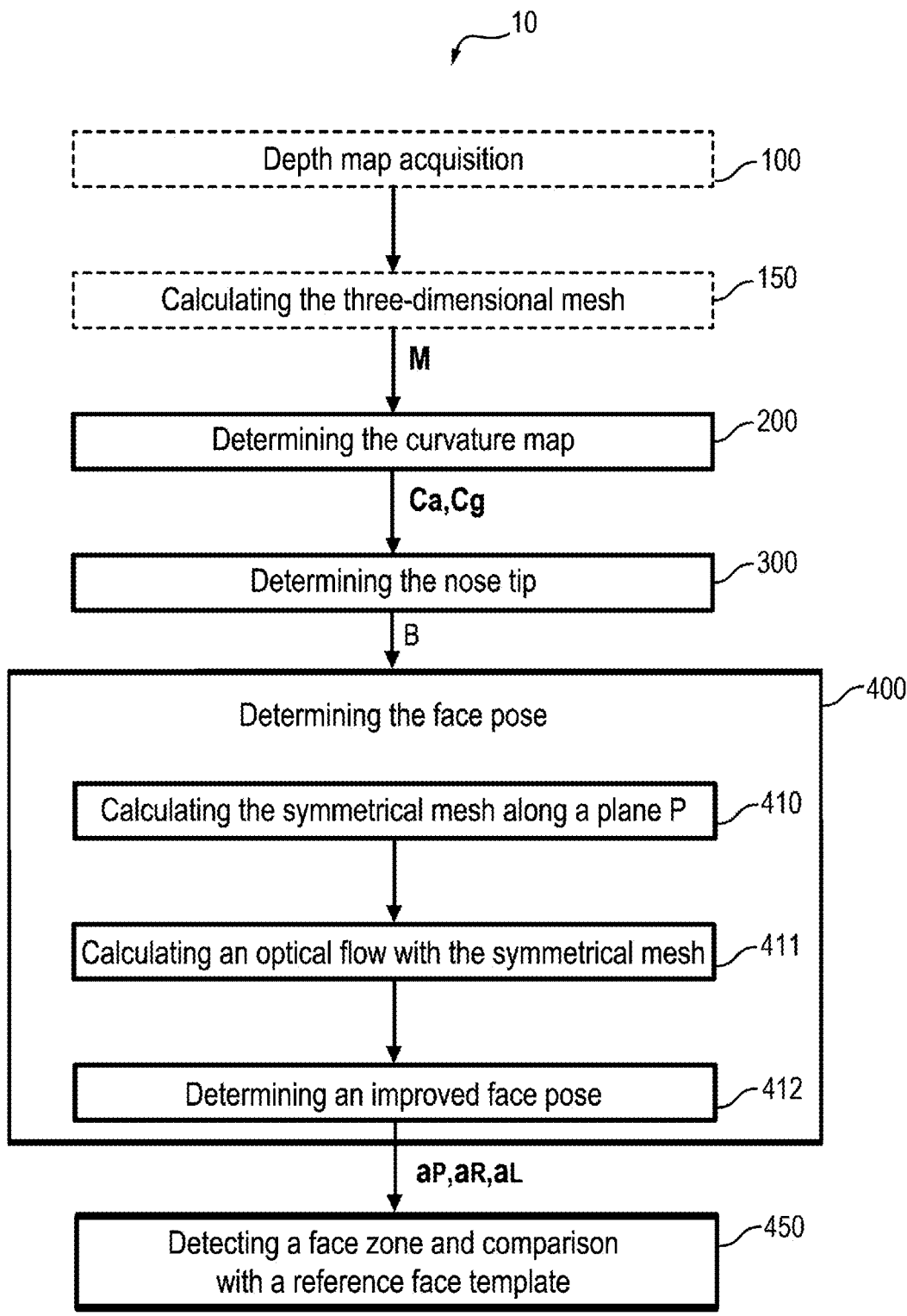
FIG. 2 depicts the steps of a method of face detection and pose determination according to one embodiment of the invention.

The method of FIG. 2 is followed by a determination of nose tip from the mesh M and from at least one curvature map in step 300, and by a determination of pose in step 400.

FIG. 5 depicts one particular embodiment of step 300 of determining the nose tip and of step 400 of determining pose from the said nose tip.

In one sub-step 310, candidate regions for containing the nose tip B are detected in the mesh M, using the curvature maps Ca and Cg.

Statistical analysis has revealed that the points x in the vicinity of the nose tip have curvatures that fit the following equations:

$$m^g < G(x) < M^g,$$

where $G(x)$ is the function that associates each point x with its Gaussian curvature, $m^g$ is a lower bound of the Gaussian curvature and $M^g$ is an upper bound of the Gaussian curvature, $$\text{and } m^a < A(x) < M^a$$

where $A(x)$ is the function that associates each point x with its Gaussian curvature, $m^a$ is a lower bound of the average curvature and $M^a$ is an upper bound of the average curvature.

The lower and upper bounds of the average curvature and Gaussian curvature are predetermined. They are chosen so as to form Gaussian curvature and average curvature intervals that are sufficiently narrow to specifically match the nose tip.

If the set of peaks that concomitantly fulfill both equations are connected, then the nose tip B is designated as being a peak of the mesh M located in the center of said set—for instance the average of the points of the connected component, meaning the center of mass of said set—and the method moves on to step 400 of pose determination.

It will be noted that detection of the tip B of the nose according to this method does not require the prior detection of any face zone inside the three-dimensional mesh M.

Thus, detection of the tip B of the nose can be achieved on a mesh that has not been preprocessed to detect a face. Indeed, the tip B of the nose may be advantageously used to delineate a zone corresponding to a phase, as seen hereinafter, and for performing the face detection.

In particular, this nose tip detection method in step 400 remains robust if the three-dimensional mesh M does not comprise any face, if it comprises a face surrounded by other elements forming a detection "noise," or if it comprises multiple faces side-by-side. Insofar as a plurality of candidate regions for containing the nose tip can be determined, it is easy to consider the next candidate to be the nose tip, in the case where a first candidate proves not to correspond to the nose tip that was sought.

Advantageously, it is therefore possible to implement the nose tip detection under unconstrained conditions, and particularly without preprocessing of the acquired depth map, without however jeopardizing the reliability of the face detection.

The set of peaks from the mesh M with average curvature $A(x)$ and Gaussian curvature $G(x)$ verify that the two equations above are not necessarily a connected set. If said set is not connected, preferably the connected components are determined of said set in order to obtain the nose tip B in step 300, the expression "connected component" being understood in its usual topological meaning.

A finite set of three-dimensional surface portions, called candidate regions $Z_1, \ldots, Z_n$ for obtaining the nose tip, is obtained. A particular example is depicted in FIGS. 6a, 6b and 6c, which respectively depict the average curvature, Gaussian curvature, and connected components that fulfill the above equations.

It will be noted in FIG. 6c that among the candidate regions, represented by colors different from that of the background, zone $Z_1$ has the largest surface area and zone $Z_2$ has the second-largest surface area. It is assumed that the candidate region that is most likely to contain a real nose tip of a face is the one with the largest surface area.

Thus, after detecting the candidate regions, the detected regions are ordered by decreasing surface area in a step 320. It is assumed (potentially temporarily) that the first candidate region, $Z_1$ in this instance, contains the nose tip. The peak that is at the center of the region $Z_1$ is therefore selected as the nose tip B.

At the end of step 300, an estimate of the position of the nose tip is available, and thus so is a first portion of the pose estimate. It will be noted that it is not necessary to have detected a zone corresponding to a face in order to obtain the estimate of the nose tip.

To complete the pose estimate, and returning to FIG. 2, the three angles of rotation of the face are determined in step 400.

As the space has an orthogonal frame of reference (X, Y, Z), the pitch angle is defined as the angle of rotation of the face from top to bottom around the axis X, the roll angle as the angle of rotation around the axis Z, and the yaw angle as the angle of rotation from left to right around the axis Y. These three angles make it possible to characterize the orientation of the face.

In FIG. 7a, depicted is a three-dimensional mesh distinct from that of FIG. 3. The axes (X, Y, Z) are also marked. Said three-dimensional mesh comprises a single face and does not comprise any additional element.

Based on that mesh, the mesh M is first translated so as to place the origin of the three axes (X, Y, Z) as overlapping with the nose tip B previously obtained. The origin has not been depicted on the nose tip in FIG. 7a.

In a sub-step 410, the yaw angle $a_L$ of the face and the roll angle $a_R$ of the face have been determined. To do so, a plane of partial symmetry P (not depicted in FIG. 7a) has been determined, such that the points of the three-dimensional mesh M are as close as possible to the points of a symmetrical mesh of the mesh M relative to the plane P. The symmetrical mesh is obtained by multiplying the coordinates along X of all peaks of the mesh M by −1. The symmetrical mesh is therefore the image of the mesh M along plane P.

In other words, the plane of symmetry is sought out such that the mesh M and the symmetrical mesh obtained by means of this plane are maximally aligned.

An orthogonal reference (X, Y, Z) is obtained by using the nose tip B as origin of the reference, and the previously obtained plane P as plane parallel to the two axes (BY) and (BZ) of the reference.

From the position of the plane P the values are determined of the yaw angle $a_L$ and roll angle $a_R$.

Identification of said plane of symmetry P has the advantage of requiring very little time and additional computer resources.

Another advantage is that a single symmetrization of the mesh is performed to identify said plane, in contrast to some pose detection methods of the prior art during which two different planes of symmetry must be tested in order to discriminate the axis Y and the axis Z during pose determination.

Optionally and advantageously, the determination of the plane of symmetry can be refined in the sub-steps 411 and 412.

In sub-step 411, a two-dimensional projection is made of the depth map of the three-dimensional mesh M. A two-dimensional projection is also made of the depth map of an image mesh M' of the three-dimensional mesh M along the plane passing through the nose tip B and containing both directions (BY) and (BZ) defined by the orthogonal reference (X, Y, Z). Both two-dimensional projections are produced along the same direction of projection. An optical flow is then calculated between the two projections: if the plane of symmetry from which the symmetrical mesh is derived is good, the calculated optical flow is low. For example, an average optical flow can be calculated between the complete three-dimensional mesh M and the image mesh thereof.

In a sub-step 412, the optical flow calculation is used, if applicable, to improve the determination of the pose derived from the three-dimensional mesh M. For example, from the same nose tip B, the alignment is improved between the three-dimensional mesh M and the reference (X, Y, Z) so as to minimize the optical flow between the mesh M and a new image mesh along the plane containing both directions (BY) and (BZ). New values of the yaw angle $a_L$ and roll angle $a_R$ are obtained, enabling the determination of the pose to be refined.

The optical flow calculation can be repeated and the pose determination can be further improved, for example up to convergence of the optical flow (sum of the optical flows below a predetermined threshold value).

The use of depth maps to calculate the optical flow is advantageous, because it minimizes the impact of outlier values calculated at the edges of the real face of the individual, the optical flow preferably being calculated from the central region of the face. The optical flow calculation is fast in computation time; moreover, the performance of said calculation does not depend on the resolution of the three-dimensional mesh.

Alternatively, the search for the plane P may be done using an ICP (Iterative Closest Point) algorithm, by testing multiple planes of symmetry and finding the optimal plane. Reference may be made to the following document: *A Method for Registration of 3D Shapes*, P. J. Besl, N. D. McKay, IEEE Transactions on Pattern Analysis and Machine Intelligence, vol. 14(2), 1992, pp. 239-256, and in particular part IV pages 243 to 246 of said document. It may be sought to minimize the sum of the total distances between the peaks and their symmetrical images. Advantageously, there is a predetermined distance threshold for defining a convergence criterion of the ICP algorithm. If the total distance is below the threshold, the values of the yaw angle $a_L$ and roll angle $a_R$ are determined based on the position of the plane P.

If the symmetrization of the mesh from the nose tip B considered is not very satisfactory (for example if the optical flow defined above does not converge, or if the ICP algorithm does not make it possible to reach a cumulative distance below the threshold), the nose tip B considered for this iteration of the ICP algorithm is considered to be a false nose tip candidate. Thus, symmetrization makes it possible, optionally and advantageously, to verify the relevance of nose tip B.

If the step 310 had made it possible to identify multiple candidate regions for containing the nose tip, and if nose tip B is defined as a false nose tip candidate, then the step 320 is repeated, ruling out the candidate region $Z_1$ and selecting the nose tip B at the center of the next candidate region $Z_2$, and so on if need be.

Returning to FIG. 2, the method 10 then comprises the delineation of a face zone composed of three-dimensional peaks of the mesh M, selected based on their position relative to the nose tip B. The face zone is considered as containing a real face of an individual.

For example, an oval can be drawn around the nose tip B, on the three-dimensional surface derived from the mesh M. The positions of the endpoints of the oval are referenced relative to the nose tip B. By way of non-limiting example, the oval extends:

to a distance of between 3 and 10 cm from the sides of the nose tip B, typically 5 cm (corresponding to the left and right sides of the face), to a distance of between 1 and 5 cm downwards from the nose tip B, typically 3 cm (corresponding to the lower zone of the face), to a distance of between 5 and 15 cm upwards from the nose tip B, typically 8 cm (corresponding to the upper zone of the face).

The directions upwards, downwards and on the sides are expressed in accordance with the orthogonal reference (X, Y, Z) obtained previously.

The zone likely to contain a face is thus delineated by means of the nose tip. Said nose tip is used as a reference point.

Once the face zone is delineated, the method continues with step 450 of validation of the face zone, by comparison between the face zone and a reference face template.

"Reference face template" is understood as a face considered as average, for which a pre-recorded three-dimensional mesh is available. During validation step 450, it is possible to apply a rotation to the mesh of the reference template, in order to restore a pose similar to the pose estimated for the three-dimensional mesh M. Optionally, a plurality of three-dimensional meshes are used as reference template. A two-dimensional projection can be produced to compare the face zone and the template.

The result of the comparison makes it possible to validate the detection of a real face in the three-dimensional mesh. If the comparison is positive, it is considered that there is a real face in the mesh, said real face corresponding to the previously delineated face zone.

However, if the comparison is negative, all of steps 320 to 450 are repeated, discarding the nose tip that had been used and moving on to the next nose tip among the nose tip candidates.

By way of illustration, depicted in FIGS. 7b and 7c are two other three-dimensional meshes, acquired under less favorable conditions than the mesh seen in FIG. 7a. Said two meshes are produced from an acquisition by a three-dimensional sensor.

FIG. 7b illustrates a mesh that comprises a face of an individual, but also a bust of the individual.

The methods known from the prior art for pose determination of a face from a three-dimensional image, such as the method described in document U.S. Pat. No. 7,436,988 B2, generally take as the initial point of origin a centroid close to the center of the acquired image, in the search for a plane of symmetry. Now, the center of the three-dimensional image visible in this figure is very far from the real nose tip of the photographed individual. Pre-processing would therefore be necessary starting from the acquisition of FIG. 7b in order to isolate the face before determining the pose, according to the method described in this document.

In contrast, the method 10 can be used starting from this acquisition with no preprocessing. If a face zone is detected far from the real face of the individual, the comparison with the reference template described previously (in relation to step 450) does not enable the presence of a face to be validated.

Thus, we automatically move on to another nose tip candidate determined from curvature maps, until a face zone is detected that is validated when compared to the referenced template.

FIG. 7c illustrates a mesh in which a background element (a wall panel here) is present in addition to a face. Moreover, the center of the three-dimensional image is not close to the nose tip. In order for the pose detection method of document U.S. Pat. No. 7,436,988 B2 to function, a preprocessing would still be necessary in order to isolate the face. However, such preprocessing is not necessary in order to apply the method 10, which has the advantage of functioning even for a face surrounded by numerous other elements, even surrounded by faces of other individuals.

The data from the plane of symmetry P (possibly improved by one of the methods described above) makes it possible to deduce the yaw angle $a_L$ of the face and the roll $a_R$ angle of the face.

With reference to FIG. 5, in one particular embodiment, the determination of the pose comprises the additional determination of a pitch angle $a_P$.

For this purpose, the sub-step 420 consists of detecting, in the mesh M, a nose ridge. The pitch angle $a_p$ corresponds to the rotation of the face around its line of sight; thus, the position of the nose ridge A makes it possible to determine the pitch angle.

The nasal ridge A is a segment in space connecting the nose tip B to the nose bridge D. The nose bridge is located at the root of the nose between the two eyebrows. In order to automatically detect the nose bridge D in the mesh, the profile PR of the face included within the plane of partial symmetry P previously determined in step 410 (or in improved plane P' obtained from this plane P) is considered. The profile of the face refers to the curve located at the intersection between the surface defined by the mesh M and the plane P.

The profile PR of the face is therefore a curve comprised within the plane P. In that curve, the nose bridge D corresponds to the maximum two-dimensional point of curvature, while the nose tip B (which is already known) corresponds to the point of minimum curvature.

FIG. 8 depicts one example of profile PR obtained in step 420, and in that profile the nose tip B and the nose bridge D are detected. Here, the curvature is oriented in the direction indicated in the axis CO.

Returning to the three-dimensional mesh M, the knowledge of the nose bridge D makes it possible to detect the pitch angle $a_P$, such as by identifying a rotation along the X axis which shows the face on the right.

As with the step 410 for determining yaw and roll, determining the profile and nose bridge may reveal that the candidate chosen for the nose tip B in step 320 was not an adequate candidate.

For instance, it may be possible to change the candidate region and repeat the steps 320 to 420 in the following cases: If the curvature of the nose tip along a facial profile is not within a predetermined interval, if the curvature of the nose bridge along a facial profile is not within a predetermined interval, or if a distance between the nose bridge and the nose tip (in other words, the length of the nasal ridge) is not within a predetermined interval.

It may also be provided to change the candidate region if the point of minimum curvature along the facial profile, considered to be a refined estimate of the nose tip B, is too far from the candidate chosen for the nose tip B.

The method for determining pose therefore has the advantage of including automatic verification that the intermediate results (particularly the estimate of the nose tip) are satisfactory, and if need be, a change to another nose tip candidate if said intermediate results are not satisfactory.

It will be noted that, just like the calculation of the plane of symmetry to determine the yaw angle and roll angle, the determination of the nasal ridge does not require having delineated and validated a face zone within the three-dimensional mesh. The face zone validation can be implemented subsequently (in step 450).

Upon completion of the method 10, if a face zone has been delineated and validated, the pose determination is terminated. Coordinates of the nose tip B, and of the roll, pitch, and yaw angles, are known.

Knowledge of these pose data provides access to a transformation of the mesh M, which makes it possible to obtain, from each peak of the initial non-frontalized mesh, a corresponding peak of a frontalized mesh that is centered and front-facing. This transformation corresponds to the following equation:

$$X_f = R*X + T,$$

where $X_f$ is the peak of the frontalized mesh obtained from the peak X of the three-dimensional mesh M, T is the translation vector of size 3×1 that takes the nose tip B to the origin of the axes, and R is the matrix of rotation of size 3×3 with angle $a_P$ along X, angle $a_R$ along Z, and angle $a_L$ along Y.

FIG. 9 depicts a frontalized mesh obtained in this way from three-dimensional peaks of the non-frontalized mesh of FIG. 7a.

Identity-Checking Method

The remainder of the document will describe a method for checking the identity of an individual in relation to FIG. 10. Identity-checking is, for instance, implemented by the system of FIG. 1 and particularly by the acquisition unit SA, the processing unit ST, and the management unit SG.

As a reminder, the management unit SG has access (in memory, or via a remote database over a secure communication network) to a plurality of images of three-dimensional reference meshes of individuals.

"Reference meshes" refers to facial meshes that were previously acquired from individuals in a certified way. Each of said meshes comprises a single face. Each reference mesh reliably corresponds to an individual. During the identity-checking, one or more images from a frontalized mesh, acquired before the check, are compared to one or more images from the reference mesh, to determine whether the frontalized mesh was acquired from the same individual as one of the reference meshes.

The reference mesh is centered on the nose tip of the individual's face, and the face is seen from the front. Potentially, the same frontalization method as the one described earlier has been previously applied to the referenced meshes to ensure that there are frontalized shots. The reference meshes are acquired in a certified way, which makes it possible to ensure that these conditions have been met.

The method of FIG. 10 applies both to identifying an individual (by looking for a reference mesh that matches that person) and to authenticating the individual (by comparing them to the reference mesh for their claimed identity).

Below, the case of authentication will be examined, with a comparison to a single reference mesh.

At the end of a face detection and pose determination method 10, followed by a frontalization 500 of the three-dimensional mesh acquired from the individual to be checked, resulting in a frontalized mesh MF, the checking method comprises a step 600 of comparing one or more channels of the frontalized mesh MF with the corresponding channels of the reference mesh.

The "channel" of the mesh refers to a two-dimensional image drawn from a decomposition of the mesh using a specific transformation. Preferably one or more channels are chosen from among the following:

depth map;

and/or map of the component along the third axis (Z above) of the normals to the three-dimensional surface in the meshes;

and/or average curvature map along the meshes;

and/or Gaussian curvature map along the meshes.

It will be understood that it is possible at this stage to isolate the face zone delineated during the face detection and pose determination method 10, and to compare only said zone of the frontalized mesh and the reference mesh, along one or more channels.

The comparison 600 comprises the generating of images corresponding to the frontalized mesh MF along the chosen channels, then the calculation of a similarity score between the frontalized mesh MF and the reference mesh, which is a function of the similarity of the chosen channels.

Preferably, in order to increase the reliability of the checking, the frontalized mesh MF and the reference mesh are compared along each of the four channels, which corresponds to four comparisons of two-dimensional images.

FIG. 11 depicts the images obtained along four of said channels from a single frontalized mesh of a face.

Very advantageously, the comparison 600 is carried out using a convolutional neural network, such as the network N1 of FIG. 1. The neural network was previously trained through deep learning to perform a comparison of two frontalized face meshes.

During the learning, the convolutional neural network preferentially received, as input data, images according to the four channels of faces to be identified. Preferably, the neural network comprises a relatively limited number of layers, to accelerate computing in a processor built into a smartphone. In this case, the prior phase of learning must have been carried out with a very large quantity of input data, such as with depth maps corresponding to several hundred acquisitions per person, out of a panel of several thousand people.

As an alternative, the comparison of the step 600 may be carried out by a processor programmed with a linear classifier, such as a naive Bayesian classifier.

However, in the context of an identity check embedded in a device such as a smartphone, a time-of-flight sensor will preferentially be used out of a desire for miniaturization, giving smaller and potentially noisier depth maps for which the naive Bayesian classifier is less effective.

With such constraints, the use of the convolutional neural network is advantageous, because it is reliable even if the measurement is noisy.

Returning to FIG. 10, a two-dimensional image of the face of the person subjected to the identity check may be further optionally compared, during a second comparison 610, to a two-dimensional reference image previously acquired from the individual in a certified way. The two-dimensional reference image may be an RGB or near-infrared image.

The two-dimensional image and the depth map that gives the frontalized mesh may be provided by the same sensor. Numerous time-of-flight or structured-light sensors are configured to acquire two-dimensional gray-scale images.

A second convolutional neural network N2, preferably distinct from the first network N1, may be provided for the identity check and provide a second, distinct similarity score. The additional comparison 610 makes the check more reliable, because it has been observed that the false positives detected by the network N1 rarely achieve a high score from the network N2, and vice versa. Associating the two-dimensional and three-dimensional data improves the performance of the individual's identification, compared to three-dimensional data alone or two-dimensional data alone.

The invention claimed is:

1. A method of face detection and face pose determination from a three-dimensional mesh comprising a plurality of three-dimensional peaks and further comprising surface elements between said peaks forming a three-dimensional surface, the method comprising the following steps executed by a processing unit:
  determining a curvature map of the three-dimensional surface, with points on the curvature map corresponding to points on the three-dimensional surface,
  detecting, within the curvature map, a nose tip where the three-dimensional surface has a predetermined curvature,
  from the three-dimensional mesh centered on the nose tip, determining a face pose, the pose being defined by coordinates of the nose tip, by a first angle of rotation of the face around a first axis, by a second angle of rotation of the face around a second axis, and by a third angle of rotation of the face around a third axis,
  delineating a face zone composed of three-dimensional peaks of the mesh selected based on the position thereof relative to the nose tip, and comparing the delineated face zone to a reference face template, a result of the comparison making it possible to validate a detection of a real face in the three-dimensional mesh and to validate the pertinence of the tip of the nose.

2. The method according to claim 1, wherein, during the step of determining a curvature map, a first curvature map is established for an average curvature and a second curvature map is established for a Gaussian curvature.

3. The method according to claim 2, wherein the step of detection comprises determining a region of the three-dimensional surface whose average curvature of points is between an average lower bound and an average upper bound, and whose Gaussian curvature of points is between a Gaussian lower bound and a Gaussian upper bound.

4. The method according to claim 3, wherein a plurality of regions of the three-dimensional surface, not connected two-by-two, are detected during the step of detection and form candidate regions,
  the center of one of the largest regions among said candidate regions being determined to be the nose tip.

5. A method of determining pose according to claim 4, comprising a determination that the largest region does not contain the nose tip in at least one of the following cases:
  after calculation of a symmetrical mesh that is the image of the three-dimensional mesh along the plane of partial symmetry, if a total distance between the points of the three-dimensional mesh and the corresponding points of the symmetrical mesh exceeds a threshold;
  if the point of minimum curvature along the profile, considered to be a refined estimate of the nose tip, is too far from the center of the largest region, or if the curvature of said point of minimum curvature is not within a predetermined interval;
  if the curvature of the nose bridge along a facial profile is not within a second predetermined interval;
  if a distance between the nose bridge and the nose tip is not within a third predetermined interval,
  said determination preferably being made before the comparison to the reference face template,
  the steps of detecting and computing the three angles of rotation then being repeated, with the largest region of the region candidates being removed.

6. The method according to claim 1, wherein the step of detecting the nose tip is implemented without prior detection of a face zone in the three-dimensional mesh or in the curvature map.

7. The method according to claim 1, wherein the calculation of at least two angles among the three angles of rotation comprises the determination of a plane of partial symmetry of the three-dimensional surface passing through the nose tip.

8. The method according to claim 7, wherein the calculation of at least one angle among the three angles of rotation comprises the detection of a bridge of the nose in the three-dimensional surface, the bridge of the nose preferably being identified as the point of maximum curvature along a profile at the intersection between the plane of partial symmetry and the three-dimensional mesh.

9. The method according to claim 7, comprising additional steps of calculating an optical flow between the points of a two-dimensional projection of the three-dimensional mesh and points of a two-dimensional projection of an image mesh of the three-dimensional mesh according to a plane passing through the previously calculated nose tip, and correction of the face pose based on the calculated optical flow.

10. The method according to claim 1, comprising preliminary steps of acquisition, by a three-dimensional sensor, of a depth map of a scene and calculation of the three-dimensional mesh based on said depth map.

11. A method of generating a front view of an individual, from a depth map, comprising the implementation of a method according to claim 10 during which the detection of a real face is validated,
  and comprising an additional step of applying to the three-dimensional mesh a rotation along the three previously determined angles of rotation, resulting in a frontalized mesh.

12. A method for checking the identity of an individual, comprising the implementation of a method for generating a front-facing shot of the individual according to claim 11,
  and comprising an additional step of comparison between at least one image of the frontalized mesh and at least one image of a three-dimensional reference mesh previously acquired from the individual in a certified way,
  the image of the frontalized mesh and the image of the three-dimensional reference mesh being chosen from one of the following four channels:
    depth map associated with said meshes;
    and/or map of a component along the third axis of the normals to the three-dimensional surface in said meshes;

and/or average curvature map along said meshes;

and/or Gaussian curvature map along said meshes, the individual being considered properly identified or not, based on the result of the comparison.

13. An identity-checking method according to claim 12, wherein the frontalized mesh and the three-dimensional reference mesh are compared using each of the four channels.

14. An identity-checking method according to claim 12, wherein the comparison is carried out by a processing unit comprising a first convolutional neural network whose parameters were learned by machine learning.

15. A system for determining face pose, comprising:
an acquisition unit comprising a three-dimensional sensor configured to acquire a depth map,
a processing unit configured to implement a method according to claim 1 so as to detect a face and determine a face pose from the depth map.

16. Non-transitory computer-readable storage medium comprising pre-saved code instructions for enabling implementation of a method according to claim 1.

* * * * *